United States Patent
Jang et al.

(10) Patent No.: US 8,350,955 B2
(45) Date of Patent: Jan. 8, 2013

(54) DIGITAL PHOTOGRAPHING APPARATUS, METHOD OF CONTROLLING THE DIGITAL PHOTOGRAPHING APPARATUS, AND RECORDING MEDIUM HAVING RECORDED THEREON A PROGRAM FOR EXECUTING THE METHOD

(75) Inventors: Soon-geun Jang, Changwon (KR); Jin-pyo Gwak, Changwon (KR); Eun-sun Ahn, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 524 days.

(21) Appl. No.: 12/322,581

(22) Filed: Feb. 4, 2009

(65) Prior Publication Data

US 2009/0207258 A1    Aug. 20, 2009

(30) Foreign Application Priority Data

Feb. 18, 2008    (KR) .................. 10-2008-0014419

(51) Int. Cl.
*G03B 7/00* (2006.01)
*H04N 5/235* (2006.01)

(52) U.S. Cl. ............... 348/362; 348/221.1; 348/208.4; 348/208.16

(58) Field of Classification Search .......... 348/208.4, 348/208.16, 221.1, 362
See application file for complete search history.

(56) References Cited

U.S. PATENT DOCUMENTS

| 7,061,524 B2 * | 6/2006 | Liu et al. ..................... 348/208.4 |
| 7,773,828 B2 * | 8/2010 | Sakata et al. .................. 382/294 |
| 2004/0179108 A1 | 9/2004 | Sorek et al. |

FOREIGN PATENT DOCUMENTS

JP    2007-257287 A    10/2007

OTHER PUBLICATIONS

Tian et al., "Algorithms for Subpixel Registration," Computer Vision, Graphics, and Image Processing, 35, pp. 220-233 (Aug. 1986).

* cited by examiner

*Primary Examiner* — Anthony J Daniels
(74) *Attorney, Agent, or Firm* — Drinker Biddle & Reath LLP (57) ABSTRACT

Provided are a digital photographing apparatus by which a clear image may be obtained despite shaking of the digital photographing apparatus during a photographing operation, a method of controlling the digital photographing apparatus, and a recording medium having recorded thereon a program for executing the method. The digital photographing apparatus includes a data obtaining unit for obtaining first data of a first image captured using a long time exposure and obtaining second data of a second image captured using a short time exposure; a motion vector extraction unit for extracting a motion vector between a position of a subject in the first image and the position of the subject in the second image; a blurring determination unit for determining whether blurring exists in the first image; a subject location determination unit for determining whether the position of the subject in the first image is identical to the position of the subject in the second image; and a data combination unit for creating data having luminance data of the second data and having composite color data obtained by combining color data of the first and second data, as ultimate data.

19 Claims, 6 Drawing Sheets

FIG. 5

DIGITAL PHOTOGRAPHING APPARATUS, METHOD OF CONTROLLING THE DIGITAL PHOTOGRAPHING APPARATUS, AND RECORDING MEDIUM HAVING RECORDED THEREON A PROGRAM FOR EXECUTING THE METHOD

CROSS-REFERENCE TO RELATED PATENT APPLICATION

This application claims the benefit of Korean Patent Application No. 10-2008-0014419, filed on Feb. 18, 2008 in the Korean Intellectual Property Office, the entire contents of which is incorporated herein by reference.

BACKGROUND OF THE INVENTION

1. Field of the Invention

The present invention relates to a digital photographing apparatus, a method of controlling the digital photographing apparatus, and a recording medium having recorded thereon a program for executing the method. More particularly, the present invention relates to a digital photographing apparatus by which a clear image may be obtained despite shaking of the digital photographing apparatus during a photographing operation, a method of controlling the digital photographing apparatus, and a recording medium having recorded thereon a program for executing the method.

2. Description of the Related Art

A digital photographing apparatus generally stores data of an image that is obtained by a photographing operation in a photographing mode. The image is generally stored into a storage medium, and the digital photographing apparatus displays the image on a display unit by using the data stored in the storage medium.

As digital photographing apparatuses have become widely popular in recent years, customers' demands for obtaining high-quality images have increased. However, a conventional digital photographing apparatus has a problem in that the clarity of a captured image is greatly reduced if the conventional digital photographing apparatus is shaken due to, for example, external vibrations or hand shaking. In particular, as a shutter speed is reduced under a low ambient light condition, an imaging device of the conventional digital photographing apparatus is exposed to light for a relatively long time. Accordingly, the possibility that the conventional digital photographing apparatus is shaken greatly increases while the imaging device is being exposed to light for a relatively long time. As a result, the clarity of the photographed image is greatly reduced.

SUMMARY OF THE INVENTION

The present invention provides a digital photographing apparatus by which a clear image may be obtained despite shaking of the digital photographing apparatus during a photographing operation, a method of controlling the digital photographing apparatus, and a recording medium having recorded thereon a program for executing the method.

According to an embodiment of the present invention, a digital photographing apparatus is provided. The digital photographing apparatus includes a data obtaining unit for obtaining first data of a first image captured using a long time exposure and obtaining second data of a second image captured using a short time exposure; a motion vector extraction unit for extracting a motion vector between a position of a subject in the first image and the position of the subject in the second image; a blurring determination unit for determining whether blurring exists in the first image; a subject location determination unit for determining whether the position of the subject in the first image is identical to the position of the subject in the second image; and a data combination unit for creating data having luminance data of the second data and having composite color data obtained by combining color data of the first and second data, as ultimate data.

The second data may be regarded as the ultimate data if the motion vector extraction unit fails to extract the motion vector, the blurring determination unit may determine whether blurring exists in the first image if the motion vector extraction unit successfully extracts the motion vector, the second data may be regarded as the ultimate data if the blurring determination unit determines that blurring exists in the first image, the subject location determination unit may determine whether the position of the subject in the first image is identical to the position of the subject in the second image if the blurring determination unit determines that blurring does not exist in the first image, wherein the first data may be regarded as the ultimate data if the subject location determination unit determines that the position of the subject in the first image is identical to the position of the subject in the second image, and the data combination unit may create the data having the luminance data of the second data and having the composite color data obtained by combining the color data of the first and second data, as the ultimate data, if the subject location determination unit determines that the position of the subject in the first image is not identical to the position of the subject in the second image.

The motion vector extraction unit may extract the motion vector between the position of the subject in the first image and the position of the subject in the second image, by using the luminance data of the first and second data obtained by the data obtaining unit.

Assuming that $I_1(x,y)$ indicates the luminance data of an $(x,y)$ pixel of the first image, $I_2(x,y)$ indicates the luminance data of an $(x,y)$ pixel of the second image, $(dx_1, dy_1)$ indicates an amount of movement of one of matched first and second images in one direction so as not to be matched to each other, and $(dx_2, dy_2)$ indicates an amount of movement of one of the matched first and second images in another direction so as not to be matched to each other, the blurring determination unit may match the first and second images to each other, may calculate $R(0)$, $R(-1)$, and $R(1)$ by respectively using Equations 1, 2, and 3, in a region A where the first and second images overlap each other, may calculate C by using Equation 4, and may determine that blurring exists in the first image if C is smaller than a preset value.

$$R(0) = \sum_{x,y \in A} |I_1(x, y) - I_2(x, y)|^2 \tag{1}$$

$$R(-1) = \sum_{x,y \in A} |I_1(x+dx_1, y+dy_1) - I_2(x, y)|^2 \tag{2}$$

$$R(1) = \sum_{x,y \in A} |I_1(x+dx_2, y+dy_2) - I_2(x, y)|^2 \tag{3}$$

$$C = \frac{R(-1) + R(1) - 2R(0)}{2} \tag{4}$$

Assuming that Area indicates an area of the region where the first and second images overlap each other and κ indicates a tuning parameter, the preset value may be calculated by using Equation 5.

$$\kappa \times \text{Area} \quad (5)$$

κ may have a value 14.

Assuming that $I_1(x,y)$ indicates the luminance data of an (x,y) pixel of the first image, $I_2(x,y)$ indicates the luminance data of an (x,y) pixel of the second image, Area indicates an area of the region where the first and second images overlap each other, $\sigma^2$ indicates a noise distribution of the first image, and κ, indicates a tuning parameter, the blurring determination unit may match the first and second images to each other, may calculate R(0) by using Equation 1 in a region A where the first and second images overlap each other, and may determine that blurring exists in the first image if R(0) is larger than a value calculated by using Equation 6.

$$R(0) = \sum_{x,y \in A} |I_1(x, y) - I_2(x, y)|^2 \quad (1)$$

$$2 \times \text{Area} \times \sigma^2 \times \kappa \quad (6)$$

The subject location determination unit may determine that the position of the subject in the first image is identical to the position of the subject in the second image if the motion vector between the position of the subject in the first image and the position of the subject in the second image is smaller than a preset size.

The subject location determination unit may determine that the position of the subject in the first image is identical to the position of the subject in the second image if a difference between the position of the subject in the first image and the position of the subject in the second image is equal to or smaller than two pixels, both in horizontal and vertical directions.

According to another embodiment of the present invention, a method of controlling a digital photographing apparatus is provided. The method includes (a) obtaining first data of a first image captured using a long time exposure and obtaining second data of a second image captured using a short time exposure; (b) determining whether a motion vector exists between a position of a subject in the first image and the position of the subject in the second image; (c) regarding the second data as ultimate data if it is determined that the motion vector does not exist in (b); (d) determining whether blurring exists on the first image if it is determined that the motion vector exists in (b); (e) regarding the second data as the ultimate data if it is determined that blurring exists in the first image in (d); (f) determining whether the position of the subject in the first image is identical to the position of the subject in the second image if it is determined that blurring does not exist in the first image in (d); (g) regarding the first data as the ultimate data if the positions are determined to be identical in (f); and (h) regarding data having luminance data of the second data and having composite color data obtained by combining color data of the first and second data, as the ultimate data, if the positions are determined not to be identical in (f).

(b) may include determining that the motion vector exists if the position of the subject in the first image is identical to the position of the subject in the second image and thus the motion vector has a value 0.

(b) may include determining whether the motion vector exists between the position of the subject in the first image and the position of the subject in the second image, by using the luminance data of the first and second data.

Assuming that $I_1(x,y)$ indicates the luminance data of an (x,y) pixel of the first image, $I_2(x,y)$ indicates the luminance data of an (x,y) pixel of the second image, $(dx_1, dy_1)$ indicates an amount of movement of one of matched first and second images in one direction so as not to be matched to each other, and $(dx_2, dy_2)$ indicates an amount of movement of one of the matched first and second images in another direction so as not to be matched to each other, (d) may include matching the first and second images to each other; calculating R(0), R(−1), and R(1) by respectively using Equations 1, 2, and 3, in a region A where the first and second images overlap each other; calculating C by using Equation 4; and determining that blurring exists in the first image if C is smaller than a preset value.

$$R(0) = \sum_{x,y \in A} |I_1(x, y) - I_2(x, y)|^2 \quad (1)$$

$$R(-1) = \sum_{x,y \in A} |I_1(x + dx_1, y + dy_1) - I_2(x, y)|^2 \quad (2)$$

$$R(1) = \sum_{x,y \in A} |I_1(x + dx_2, y + dy_2) - I_2(x, y)|^2 \quad (3)$$

$$C = \frac{R(-1) + R(1) - 2R(0)}{2} \quad (4)$$

Assuming that Area indicates an area of the region where the first and second images overlap each other and κ indicates a tuning parameter, the preset value may be calculated by using Equation 5.

$$\kappa \times \text{Area} \quad (5)$$

κ may have a value 14.

Assuming that $I_1(x,y)$ indicates the luminance data of an (x,y) pixel of the first image, $I_2(x,y)$ indicates the luminance data of an (x,y) pixel of the second image, Area indicates an area of the region where the first and second images overlap each other, $\sigma^2$ indicates a noise distribution of the first image, and κ indicates a tuning parameter, (d) may include matching the first and second images to each other; calculating R(0) by using Equation 1 in a region A where the first and second images overlap each other; and determining that blurring exists in the first image if R(0) is larger than a value calculated by using Equation 6.

$$R(0) = \sum_{x,y \in A} |I_1(x, y) - I_2(x, y)|^2 \quad (1)$$

$$2 \times \text{Area} \times \sigma^2 \times \kappa \quad (6)$$

(f) may include determining that the position of the subject in the first image is identical to the position of the subject in the second image if the motion vector between the position of the subject in the first image and the position of the subject in the second image is smaller than a preset size.

(f) may include determining that the position of the subject in the first image is identical to the position of the subject in the second image if a difference between the position of the subject in the first image and the position of the subject in the second image is equal to or smaller than two pixels both in horizontal and vertical directions.

According to another embodiment of the present invention, a recording medium having recorded thereon a program for executing the method is provided.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings.

Figure 1:
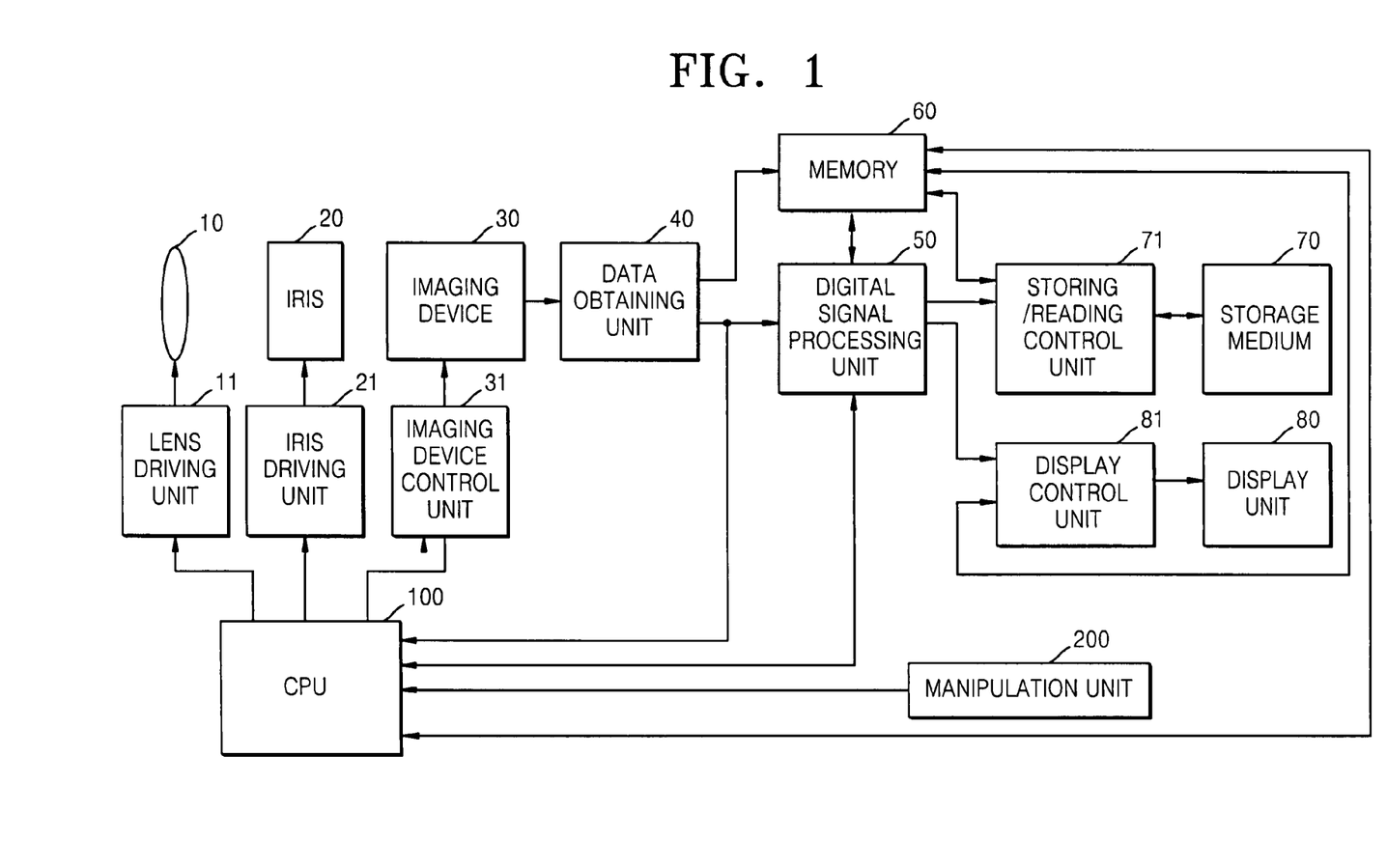
FIG. 1 is a schematic block diagram of an example of a digital photographing apparatus according to an embodiment of the present invention.
Figure 2:
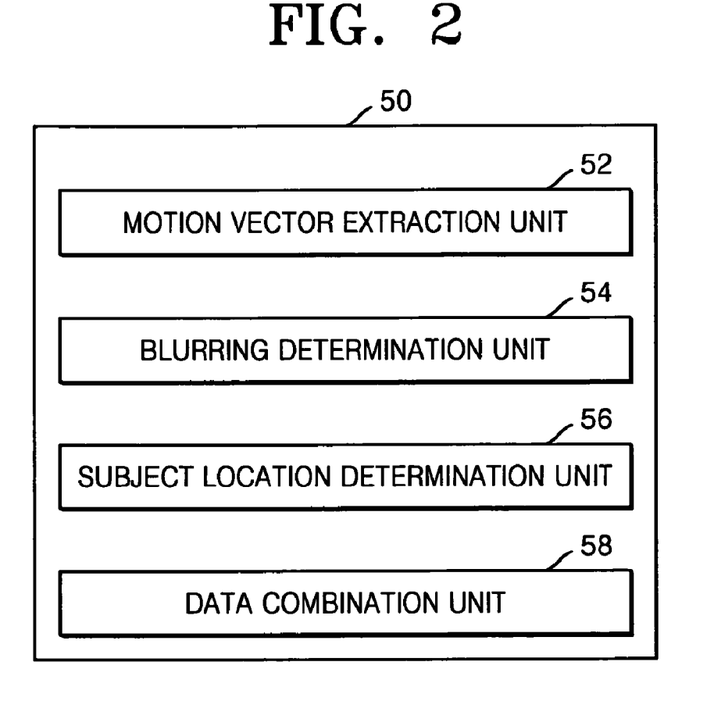
FIG. 2 is a schematic block diagram of an example of a portion of the digital photographing apparatus illustrated in FIG. 1, according to an embodiment of the present invention.

FIG. 1 is a schematic block diagram of an example of a digital photographing apparatus according to an embodiment of the present invention. FIG. 2 is a schematic block diagram of an example of a portion of the digital photographing apparatus illustrated in FIG. 1, according to an embodiment of the present invention.

General operation of the digital photographing apparatus according to the current embodiment of the present invention is managed by a central processing unit (CPU) 100. Also, the digital photographing apparatus includes a manipulation unit 200 including, for example, keys for generating electric signals based on a user's input. The electric signals generated by the manipulation unit 200 are transmitted to the CPU 100 so that the CPU 100 may control the digital photographing apparatus in accordance with the electric signals.

In a photographing mode, when an electric signal based on a user's input is applied to the CPU 100, the CPU 100 controls a lens driving unit 11, an iris driving unit 21, and an imaging device control unit 31 so as to respectively adjust a position of a lens 10, an opening degree of an iris 20, and sensitivity of an imaging device 30. The imaging device 30 creates data of an image obtained from input light and a data obtaining unit 40 obtains the data created by the imaging device 30. More particularly, the data obtaining unit 40 obtains first data of a first image of a subject, which is captured using a long time exposure, and second data of a second image of the subject, which is captured using a short time exposure. Detailed descriptions thereof will be provided later. The data obtaining unit 40 may be an analog-to-digital (A/D) conversion unit or may include the A/D conversion unit, for example. In this case, it is obvious that the A/D conversion unit may not be included in the digital photographing apparatus in accordance with characteristics of the imaging device 30. The data obtaining unit 40 may be a portion of a digital signal processing unit 50 to be described later, for example. Meanwhile, it is obvious that various changes may be made to the data obtaining unit 40. For example, because the data on the image is created by the lens 10, the iris 20, and the imaging device 30, the data obtaining unit 40 may not be a separate component as illustrated in FIG. 1, but may be a component of at least one of the lens 10, the iris 20, and the imaging device 30. Hereinafter, a component for creating or obtaining data on an image obtained by photographing a subject is referred to as the data obtaining unit 40.

The data obtained by the data obtaining unit 40 may be input to the digital signal processing unit 50 through a memory 60 or may be directly input to the digital signal processing unit 50. When necessary, the data may be input to the CPU 100. Here, examples of the memory 60 include read-only memory (ROM) and random access memory (RAM). When necessary, the digital signal processing unit 50 may perform digital signal processing such as gamma correction and white balance adjustment. Also, as illustrated in FIG. 2, the digital signal processing unit 50 may include other components such as a motion vector extraction unit 52, a blurring determination unit 54, a subject location determination unit 56, and a data combination unit 58, for example. Here, various changes may be made. For example, each of the motion vector extraction unit 52, the blurring determination unit 54, the subject location determination unit 56, and the data combination unit 58 may be a separate component that is not included in the digital signal processing unit 50, for example. In other words, it is acceptable as long as the motion vector extraction unit 52, the blurring determination unit 54, the subject location determination unit 56, and the data combination unit 58 are included in the digital photographing apparatus according to the current embodiment of the present invention, for example. Hereinafter, for convenience of explanation, it is assumed that the motion vector extraction unit 52, the blurring determination unit 54, the subject location determination unit 56, and the data combination unit 58 are included in the digital signal processing unit 50, for example. Operations of the motion vector extraction unit 52, the blurring determination unit 54, the subject location determination unit 56, and the data combination unit 58 will be described in detail later.

The data output from the digital signal processing unit 50 may be transmitted to the display control unit 81 through the memory 60 or may be directly transmitted, for example. The display control unit 81 controls a display unit 80 so as to display an image thereon. The data output from the digital signal processing unit 50 is input to a storing/reading control unit 71 through the memory 60 or may be directly input. The storing/reading control unit 71 stores the data in a storage medium 70 in accordance with a signal based on a user's input or may automatically store the data. It is obvious that the storing/reading control unit 71 may read data of an image, from an image file stored in the storage medium 70, and input the data to the display control unit 81 through the memory 60 or by any other path so as to display the image on the display unit 80. The storage medium 70 may be detachable from the digital photographing apparatus or may be permanently fixed in the digital photographing apparatus.

Figure 3A:
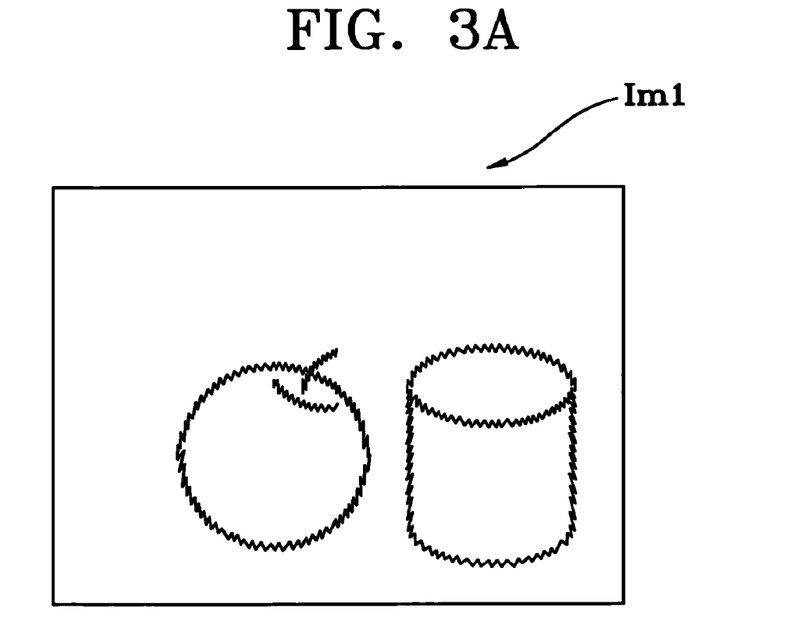
FIG. 3A is a conceptual view of an example of a first image captured using a long time exposure by the digital photographing apparatus illustrated in FIG. 1, according to an embodiment of the present invention.
Figure 3B:
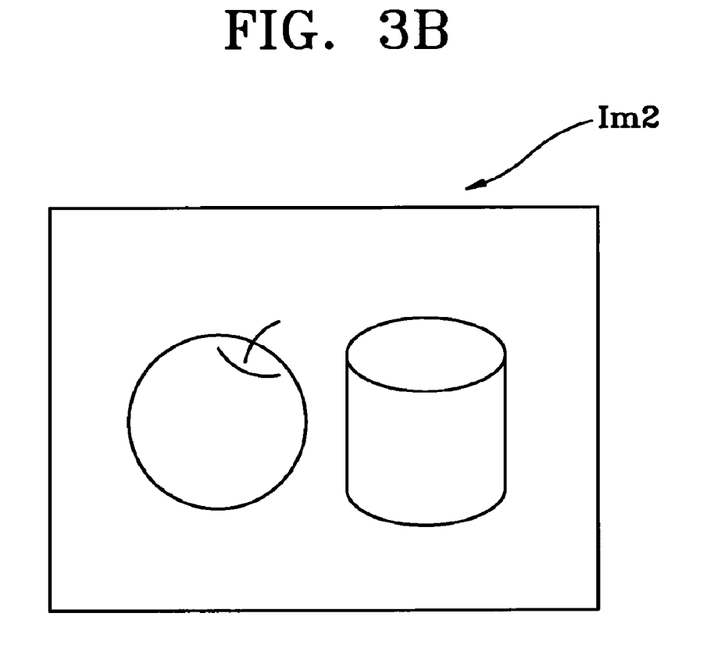
FIG. 3B is a conceptual view of an example of a second image captured using a short time exposure by the digital photographing apparatus illustrated in FIG. 1, according to an embodiment of the present invention.
Figure 3C:
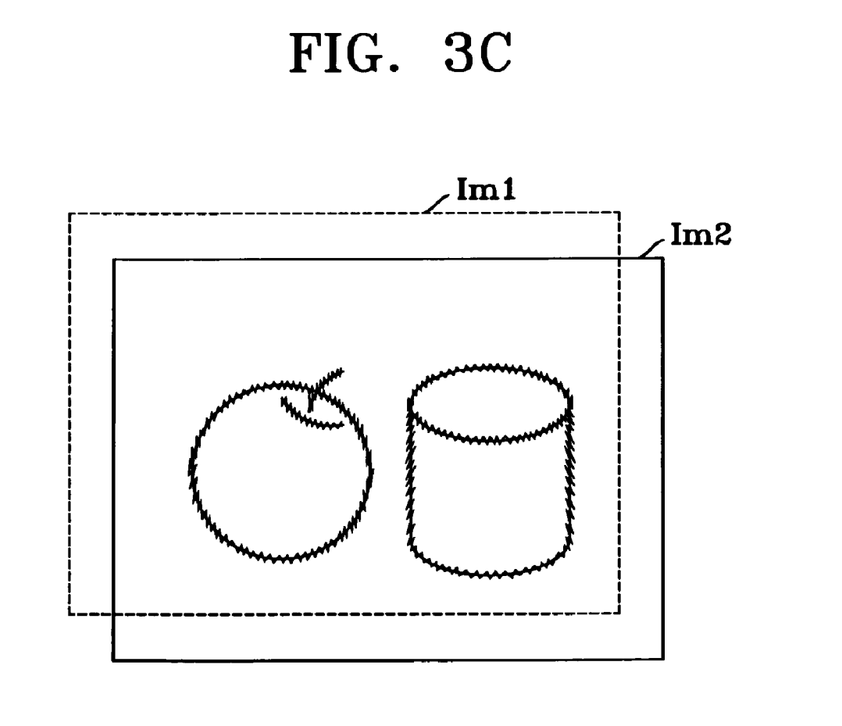
FIG. 3C is a conceptual view of an example in a case when subjects of the first and second images respectively illustrated in FIGS. 3A and 3B are matched to each other, according to an embodiment of the present invention.
Figure 3D:
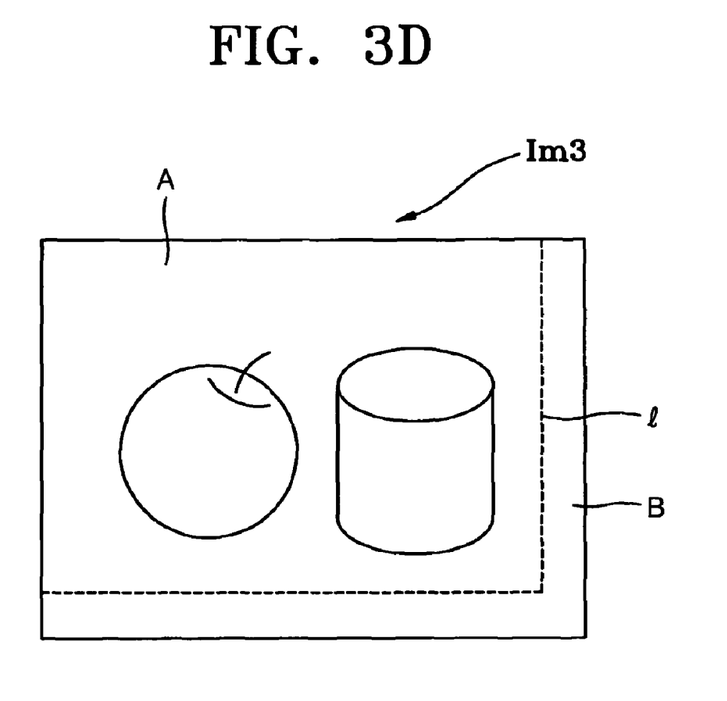
FIG. 3D is a conceptual view of an example of a third image obtained by simply combining the first and second images respectively illustrated in FIGS. 3A and 3B, according to an embodiment of the present invention.
Figure 4:
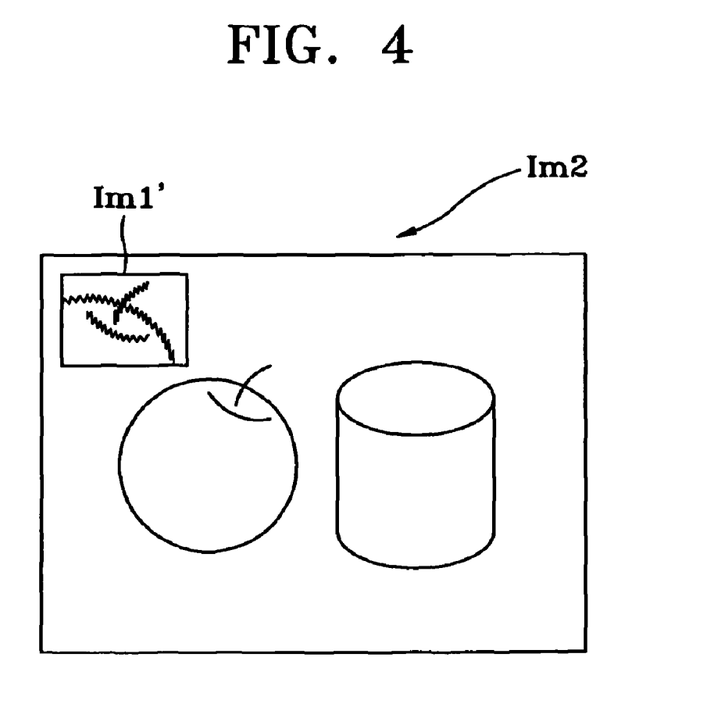
FIG. 4 is a conceptual view for describing an example of a method of extracting a motion vector between a position of a subject in the first image illustrated in FIG. 3A and the position of the subject in the second image illustrated in FIG. 3B, according to an embodiment of the present invention.
Figure 5:
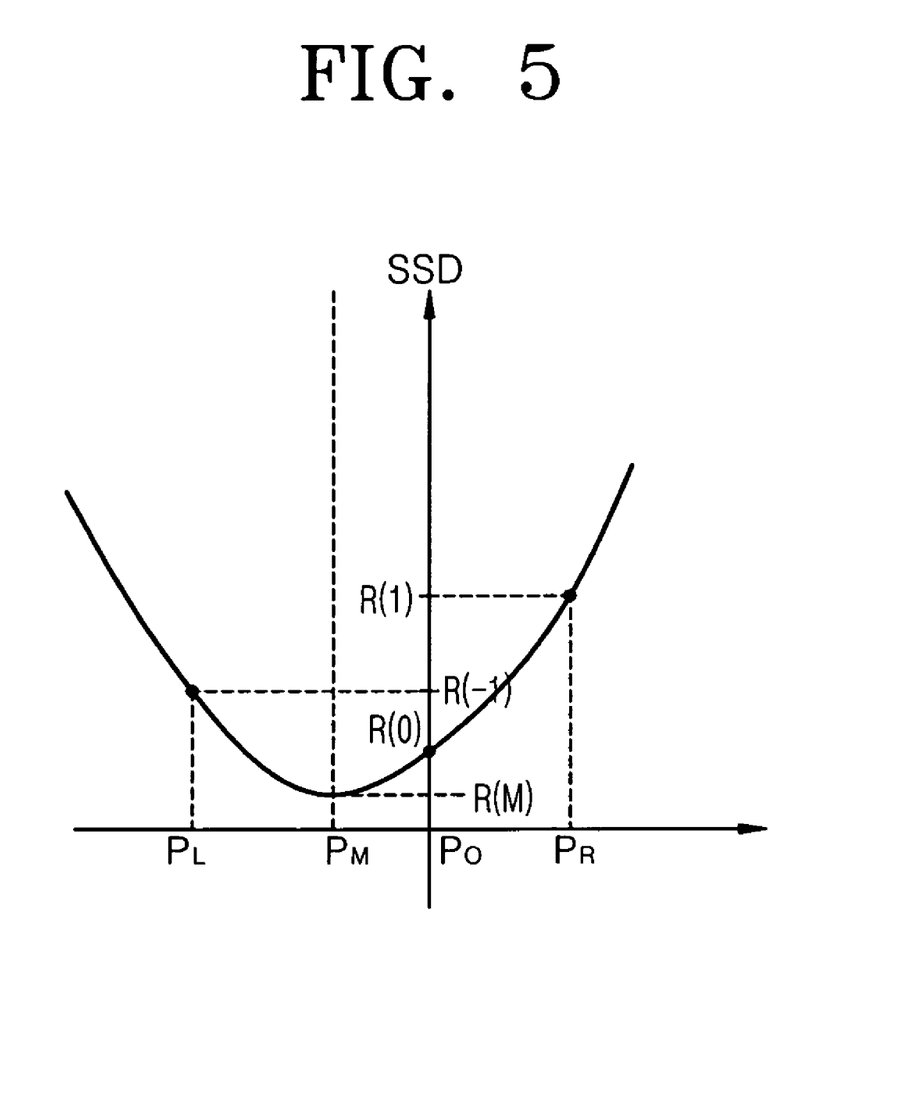
FIG. 5 is a conceptual view for describing an example of a method of accurately extracting a motion vector between a position of a subject in the first image illustrated in FIG. 3A and the position of the subject in the second image illustrated in FIG. 3B, according to an embodiment of the present invention.

FIG. 3A is a conceptual view of an example of a first image Im1 captured using a long time exposure by the digital photographing apparatus illustrated in FIG. 1, according to an embodiment of the present invention. FIG. 3B is a conceptual view of an example of a second image Im2 captured using a short time exposure by the digital photographing apparatus illustrated in FIG. 1, according to an embodiment of the present invention. FIG. 3C is a conceptual view of an example of a case where subjects in the first and second images Im1 and Im2 respectively illustrated in FIGS. 3A and 3B are matched to each other, according to an embodiment of the present invention. FIG. 3D is a conceptual view of an example of a third image Im3 obtained by simply combining the first and second images Im1 and Im2 respectively illustrated in FIGS. 3A and 3B, according to an embodiment of the present invention. FIG. 4 is a conceptual view for describing an example of a method of extracting a motion vector between a position of a subject in the first image Im1 illustrated in FIG. 3A and the position of the subject in the second image Im2 illustrated in FIG. 3B, according to an embodiment of the present invention. FIG. 5 is a conceptual view for describing an example of a method of accurately extracting a motion vector between a position of a subject in the first image Im1 illustrated in FIG. 3A and the position of the subject in the second image Im2 illustrated in FIG. 3B, according to an embodiment of the present invention. Operations of the digital photographing apparatus illustrated in FIG. 1 will now be described with reference to FIGS. 3A through 3D, 4, and 5. FIGS. 3A through 3D, 4, and 5 will be described in conjunction with FIGS. 1 and 2.

When a photographing signal is received from a user in a photographing mode, the data obtaining unit 40 obtains first data on the first image Im1 illustrated in FIG. 3A, captured using a long time exposure, and then obtains second data on the second image Im2 illustrated in FIG. 3B, captured using a short time exposure, for example. Here, it is obvious that various changes may be made to a data obtaining order. For example, the second data on the second image Im2 may be captured using a short time exposure and then the first data on the first image Im1 may be captured using a long time exposure.

When the first data on the first image Im1 is captured using a long time exposure, due to a low shutter speed, there is a greater possibility that the digital photographing apparatus is shaken while the imaging device 30 is being exposed to light and thus clarity of the first image Im1 may be greatly reduced as illustrated in FIG. 3A. In particular, under a low ambient light condition, because a shutter speed has to become slow in order to obtain the first image Im1 having an appropriate brightness, the clarity of the first image Im1 may be greatly reduced.

When the second data on the second image Im2 is captured using a short time exposure, due to a fast shutter speed, the imaging device 30 is exposed to light for a short period of time and thus the second image Im2 that is relatively clear, is obtained as illustrated in FIG. 3B. However, in the second image Im2, due to the fast shutter speed, sensitivity of the imaging device 30 has to be increased in order to obtain the second image Im2 having an appropriate brightness and thus the second image Im2 may have a relatively large amount of noise. If the sensitivity of the imaging device 30 is not increased in order to prevent noise when the second data on the second image Im2 is obtained, due to the fast shutter speed, the imaging device 30 is exposed to light for a short period of time and thus the second image Im2 that is clear but relatively dark, may be obtained.

In the digital photographing apparatus according to an embodiment of the present invention, data on an ultimate image that is clear and has little noise, is obtained by combining the first data of the first image Im1 captured using a long time exposure and the second data of the second image Im2 captured using a short time exposure. Detailed descriptions thereof will be provided later.

The motion vector extraction unit 52 extracts the motion vector between the position of the subject in the first image Im1 and the position of the subject in the second image Im2. In more detail, the motion vector extraction unit 52 extracts the motion vector that is a vector of a size and direction for moving the first image Im1 or the second image Im2 in order to match the subject in the first image Im1 and the subject in the second image Im2.

As illustrated in FIG. 4, a portion corresponding to a portion Im1' of the first image Im1 is detected from the second image Im2. Conceptually, by moving a position of the portion Im1' of the first image Im1 in the second image Im2, a sum of squared difference (SSD) is calculated in the portion Im1' of the first image Im1 at each position by using Equation 7. Here, $I_1(x,y)$ indicates luminance data of an (x,y) pixel of the first image Im1, and $I_2(X,y)$ indicates the luminance data of an (x,y) pixel of the second image Im2. At the position of the portion Im1' of the first image Im1 when a calculated SSD has a small value, the portion Im1' of the first image Im1 overlaps a corresponding portion of the second image Im2.

$$R(0) = \sum_{x,y \in Im1'} |I_1(x, y) - I_2(x, y)|^2 \quad (7)$$

When the portion Im1' of the first image Im1 overlaps the corresponding portion of the second image Im2, correlation between the first and second images Im1 and Im2 may be conceptually represented as illustrated in FIG. 3C. As such, the motion vector extraction unit 52 extracts the motion vector that is the vector of the size and direction for moving the first image Im1 or the second image Im2 in order to match the subject in the first image Im1 in accordance with the first data obtained by the data obtaining unit 40 and the subject in the second image Im2 in accordance with the second data obtained by the data obtaining unit 40.

However, although the first and second images Im1 and Im2 are matched to each other, if the first data of the first image Im1 captured using a long time exposure is always combined with the second data of the second image Im2 captured using a short time exposure regardless of any other condition, high quality of the data on the ultimate image may not be guaranteed. In other words, for example, if the first and second images Im1 and Im2 are matched to each other as illustrated in FIG. 3C so as to generate the third image Im3 illustrated in FIG. 3D which is the ultimate image, information on the first image Im1 is main information in a region A and information on the second image Im2 is the main information in a region B. Thus, a shape indicated by a dotted line Q may occur in a border region between the regions A and B. Accordingly, in the digital photographing apparatus according to an embodiment of the present invention, the data on the ultimate image that is clear and has little noise, is obtained by obtaining the ultimate image in accordance with a condition of the first and second images Im1 and Im2.

The motion vector extraction unit 52 extracts the motion vector between the position of the subject in the first image Im1 and the position of the subject in the second image Im2 as described above with reference to FIGS. 3A through 3C and 4. If it is necessary to more accurately extract the motion vector, a method to be described below with reference to FIG. 5 may be used, for example. That is, as described above with reference to FIG. 4, by moving the position of the portion Im1' of the first image Im1 in the second image Im2, the SSD is calculated in the region A that is a portion of the first image Im1 at each position by using Equation 7 and a smallest value of the SSD is referred to as R(0). Then, the SSD is calculated by moving the position of the portion Im1' by ($dx_1$, $dy_1$) in one direction from a position corresponding to R(0) and its calculated value is referred to as R(−1) (refer to Equation 8), and the SSD is calculated by moving the position of the portion Im1' by ($dx_2$, $dy_2$) in another direction and its calculated value is referred to as R(1) (refer to Equation 9).

$$R(-1) = \sum_{x,y \in Im1'} |I_1(x+dx_1, y+dy_1) - I_2(x, y)|^2 \quad (8)$$

$$R(1) = \sum_{x,y \in Im1'} |I_1(x+dx_2, y+dy_2) - I_2(x, y)|^2 \quad (9)$$

In FIG. 5, R(−1), R(0), and R(1) and $P_L$, $P_O$, and $P_R$ which are positions of the portion Im1' of the first image Im1 and correspond to R(−1), R(0), and R(1), are represented on a coordinate system and a two dimensional curve fitting process is performed, for example, performing a method of least squares on R(−1), R(0), and R(1). By performing the two dimensional curve fitting process, it is clear that R(M) which has a minimum value and is smaller than R(0), exists. $P_M$ of the portion Im1' of the first image Im1, which corresponds to R(M), may be determined with an accuracy of an order of sub-pixels so as to more accurately extract the motion vector. Detailed information on the method of accurately extracting a motion vector is provided in "Algorithms for Subpixel Registration," Qi Tian and Michael N. Huhns, Computer Vision, Graphics, and Image Processing, vol. 35, pp. 220-233, August 1986, the disclosure of which is incorporated herein by reference in its entirety.

When the motion vector is extracted as described above, the motion vector extraction unit 52 may extract the motion vector between the position of the subject in the first image Im1 and the position of the subject in the second image Im2, by using luminance data of the first and second data obtained by the data obtaining unit 40. Each of the first and second data may include the luminance data and color data. When the motion vector between the first and second images Im1 and Im2 is extracted, the position of the subject in each image matters and thus the motion vector may be extracted by using only the luminance data instead of the color data. Accordingly, the amount of data to be calculated may be greatly reduced.

When the motion vector extraction unit 52 extracts the motion vector between the first and second images Im1 and Im2, in some cases, the motion vector extraction unit 52 may, for various reasons, fail to extract the motion vector. For example, the motion vector extraction unit 52 may fail to extract the motion vector if the clarity of the subject in the first image Im1 captured using a long time exposure, is extremely reduced due to hand shaking or movement of the subject being photographed. In this case, the digital photographing apparatus according to an embodiment of the present invention regards the second data on the second image Im2 captured by the data obtaining unit 40 during a short time exposure, as the data of the ultimate image. It is obvious that the motion vector extraction unit 52 determines that the motion vector exists if the motion vector has a value 0. This is because the fact that the motion vector has a value 0 may mean that the first and second images Im1 and Im2 are identical to each other.

If the motion vector between the first and second images Im1 and Im2 is successfully extracted by the motion vector extraction unit 52, the blurring determination unit 54 determines whether blurring exists in the first image Im1. The blurring determination unit 54 may use various methods. For example, the blurring determination unit 54 may use the following method.

First, the first and second images Im1 and Im2 are matched to each other so as to calculate R(0), R(−1), and R(1) by respectively using Equations 1, 2, and 3, in the region A where the first and second images Im1 and Im2 overlap each other. In Equation 2, ($dx_1$, $dy_1$) indicates that the position of the first image Im1 is moved by ($dx_1$, $dy_1$) in one direction after the first and second images Im1 and Im2 are matched to each other, and ($dx_2$, $dy_2$) indicates that the position of the first image Im1 is moved by ($dx_2$, $dy_2$) in another direction after the first and second images Im1 and Im2 are matched to each other. After that, C is calculated by using Equation 4. If C is smaller than a preset value, it is determined that blurring exists in the first image Im1.

$$R(0) = \sum_{x,y \in A} |I_1(x, y) - I_2(x, y)|^2 \quad (1)$$

$$R(-1) = \sum_{x,y \in A} |I_1(x+dx_1, y+dy_1) - I_2(x, y)|^2 \quad (2)$$

$$R(1) = \sum_{x,y \in A} |I_1(x+dx_2, y+dy_2) - I_2(x, y)|^2 \quad (3)$$

$$C = \frac{R(-1) + R(1) - 2R(0)}{2} \quad (4)$$

C varies in accordance with R(0) rather than R(−1) and R(1). If blurring does not exist in the first image Im1, R(0) has a value 0. That is, the less blurring that exists in the first image Im1, the smaller value R(0) has in comparison to (R−1) and/or R(1) and thus the larger value C has. The more blurring that exists in the first image Im1, the larger number R(0) has and thus the smaller value C has. Accordingly, the fact that C is smaller than the preset value means that more blurring exists in the first image Im1 or edges do not exist in the first image Im1. As such, if the blurring determination unit 54 determines that blurring exists in the first image Im1, the first data of the first image Im1 and the second data of the second image Im2 are not combined and the second data on which blurring does not exist is regarded as ultimate data because, although the blurring determination unit 54 determines that blurring exists in the first image Im1, if the first data of the first image Im1 and the second data of the second image Im2 are combined, quality of the ultimate image is low.

Assuming that Area indicates an area of the region A where the first and second images Im1 and Im2 overlap each other and κ indicates a tuning parameter, the preset value that is used when the blurring determination unit 54 determines whether blurring exists in the first image Im1, may be calculated by using Equation 5.

$$\kappa \times Area \quad (5)$$

The fact that blurring exists in the first image Im1 means that a condition of $C<\kappa \times Area$ is satisfied. $C<\kappa \times Area$ is derived from $C/Area<\kappa$. C is divided by Area in order to normalize R(−1), R(1), and R(0), which are each used to calculate C, and C is obtained by squaring a difference between pixels and thus has a large size. κ is determined by repeatedly performing a test and may vary in accordance with characteristics of a component of the digital photographing apparatus, such as the lens 10 and/or the imaging device 30. Preferably, κ may have a value 14.

The blurring determination unit 54 may also determine whether blurring exists in the first image Im1 by using a different method. For example, the first and second images Im1 and Im2 are matched to each other so as to calculate R(0) by using Equation 1 in the region A where the first and second images Im1 and Im2 overlap each other. Assuming that Area indicates an area of the region A where the first and second images Im1 and Im2 overlap each other, $\sigma^2$ indicates a noise distribution of the first image Im1, and κ indicates a tuning parameter, if R(0) is larger than a value calculated by using Equation 6, it is determined that blurring exists in the first image Im1.

$$2 \times Area \times \sigma^2 \times \kappa \quad (6)$$

The more blurring that exists in the first image Im1 captured using a long time exposure, the larger value the SSD obtained from the first and second images Im1 and Im2 has. In this case, the size of a value of the SSD is proportional to a noise level of an image.

If the blurring determination unit 54 determines that blurring does not exist in the first image Im1, the subject location determination unit 56 determines whether the position of the subject of the first image Im1 is identical to the position of the subject of the second image Im2. For example, if the motion vector extracted by the motion vector extraction unit 52 is smaller than a preset size, the subject location determination unit 56 may determine that the position of the subject of the first image Im1 is identical to the position of the subject of the second image Im2. Also, if a difference between the position of the subject of the first image Im1 and the position of the subject of the second image Im2 is equal to or smaller than two pixels both in horizontal and vertical directions, the subject location determination unit 56 may determine that the position of the subject of the first image Im1 is identical to the position of the subject of the second image Im2.

The fact that it is determined that blurring does not exist in the first image Im1 and that the position of the subject in the first image Im1 is identical to the position of the subject in the second image Im2, means that the first image Im1 itself is a clear image without shaking. Accordingly, if the subject location determination unit 56 determines that the position of the subject of the first image Im1 is identical to the position of the subject of the second image Im2, the first data is regarded as the ultimate data. If the subject location determination unit 56 determines that the position of the subject of the first image Im1 is not identical to the position of the subject of the second image Im2, composite data created by the data combination unit 58 is regarded as the ultimate data. The data combination unit 58 creates data having the luminance data of the second data and composite color data obtained by combining the color data of the first and second data, as the ultimate data.

As described above, unlike the conventional digital photographing apparatus that combines the first data of the first image Im1 captured using a long time exposure and the second data of the second image Im2 captured using a short time exposure regardless of any other condition, in the digital photographing apparatus according to an embodiment of the present invention, the motion vector extraction unit 52 determines whether the motion vector is extracted, the blurring determination unit 54 determines whether blurring exists in the first image Im1, and the subject location determination unit 56 determines whether the position of the subject in the first image Im1 is identical to the position of the subject in the second image Im2. In accordance with determination results, the first data of the first image Im1, the second data of the second image Im2, or the composite data obtained by combining the first data on the first image Im1 and the second data on the second image Im2, may be regarded as the ultimate data. Thus, an image which is clear, has little noise, and is optimized according to a different condition may be obtained as the ultimate image.

Figure 6:
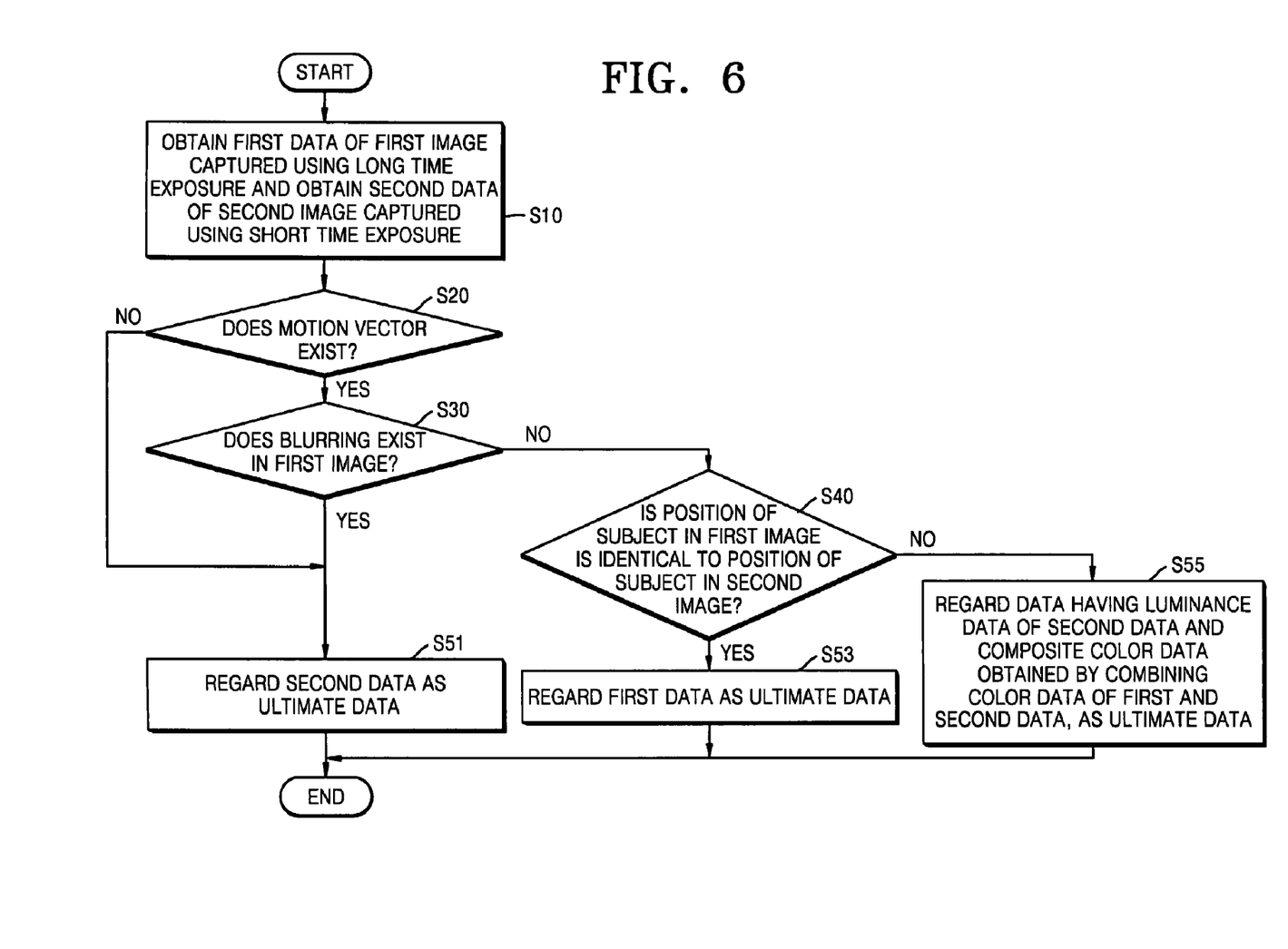
FIG. 6 is a flowchart of an example of a method of controlling a digital photographing apparatus, according to an embodiment of the present invention.

FIG. 6 is a flowchart of an example of a method of controlling a digital photographing apparatus, according to an embodiment of the present invention.

Referring to FIG. 6, first data on a first image is captured using a long time exposure and second data on a second image is captured using a short time exposure, in operation S10. Then, it is determined whether a motion vector exists between a position of a subject in the first image and the position of the subject in the second image, in operation S20. If it is determined that the motion vector does not exist, the second data is regarded as ultimate data in operation S51. If it is determined that the motion vector exists, it is determined whether blurring exists in the first image, in operation S30. If it is determined that blurring exists in the first image, the second data is regarded as the ultimate data in operation S51. If it is determined that blurring does not exist in the first image, it is determined whether the position of the subject in the first image is identical to the position of the subject in the second image, in operation S40. If identical, the first data is regarded as the ultimate data in operation S53. If not identical, data having luminance data of the second data and having composite color data obtained by combining color data of the first and second data is regarded as the ultimate data, in operation S55.

By determining which image is determined as an ultimate image from among the first image, the second image, and a composite image obtained by combining the first and second images, in consideration of various conditions described above, an image that is optimized according to a different condition may be obtained as the ultimate image.

Descriptions of determination standards and methods in the above operations are provided above with reference to FIGS. 1, 2, 3A through 3D, 4, and 5. For example, in operation S20, it may be determined whether the motion vector between the position of the subject in the first image and the position of the subject in the second image exists, by using the luminance data of the first and second data. Also, in operation S30, it may be determined whether blurring exists in the first image with reference to the above descriptions regarding Equations 1 through 6. Furthermore, in operation S40, the position of the subject in the first image may be determined to be identical to the position of the subject in the second image if the motion vector between the position of the subject in the first image and the position of the subject in the second image is smaller than a preset size or if a difference between the position of the subject in the first image and the position of the subject in the second image is equal to or smaller than two pixels, both in horizontal and vertical directions.

A program for executing a method of controlling a digital photographing apparatus, according to the above embodiments of the present invention can be recorded on a recording medium, for example. Here, the recording medium may be the memory 60 or the storage medium 70 which are illustrated in FIG. 1, or any other storage medium, for example. Here, examples of the recording medium include magnetic storage media (e.g., ROM, floppy disks, hard disks, and the like) and optical recording media (e.g., CD-ROMs, or DVDs).

As described above, according to the present invention, a clear image may be obtained despite shaking of the digital photographing apparatus during a photographing operation.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A digital photographing apparatus comprising:
a data obtaining unit to obtain first data of a first image captured using a long time exposure and to obtain second data of a second image captured using a short time exposure;
a motion vector extraction unit to determine a motion vector between a first position of a subject in the first image and a second position of the subject in the second image;
a blurring determination unit to determine whether blurring exists in the first image;
a subject location determination unit to determine whether the first position of the subject in the first image is substantially identical to the second position of the subject in the second image; and
a data combination unit to form third data comprising luminance data of only the second data and composite color data obtained by combining first color data of the first data and second color data of the second data.

2. The digital photographing apparatus of claim 1, wherein:
the data combination unit is to select the second data as the third data when the motion vector extraction unit fails to extract the motion vector;
the subject location determination unit is to determine whether the first position of the subject in the first image is substantially identical to the second position of the subject in the second image when the motion vector extraction unit fails to extract the motion vector;
the data combination unit is to select the first data as the third data when the subject location determination unit determines that the first position of the subject in the first image is substantially identical to the second position of the subject in the second image; and
the data combination unit is to form the third data comprising luminance data of the second data and composite color data obtained by combining first color data of the first data and second color data of the second data when the subject location determination unit determines that the first position of the subject in the first image is not substantially identical to the second position of the subject in the second image.

3. The digital photographing apparatus of claim 1, wherein the motion vector extraction unit is to extract the motion vector between the first position of the subject in the first image and the second position of the subject in the second image using the luminance data of the second data and second luminance data of the first data.

4. The digital photographing apparatus of claim 1, wherein the subject location determination unit is to determine that the first position of the subject in the first image is substantially identical to the second position of the subject in the second image when the motion vector between the first position of the subject in the first image and the second position of the subject in the second image is smaller than a threshold.

5. The digital photographing apparatus of claim 1, wherein the subject location determination unit is to determine that the first position of the subject in the first image is substantially identical to the second position of the subject in the second image when a difference between the first position of the subject in the first image and the second position of the subject in the second image is equal to or smaller than two pixels, both in horizontal and vertical directions.

6. A digital photographing apparatus comprising:
a data obtaining unit to obtain first data of a first image captured using a long time exposure and to obtain second data of a second image captured using a short time exposure;
a motion vector extraction unit to determine a motion vector between a first position of a subject in the first image and the position of the subject in the second image;
a blurring determination unit to determine whether blurring exists in the first image;
a subject location determination unit to determine whether the position of the subject in the first image is identical to the position of the subject in the second image; and
a data combination unit to create data having luminance data of the second data and having composite color data obtained by combining color data of the first and second data, as ultimate data,
wherein, assuming that $I_1(x,y)$ indicates the luminance data of an (x,y) pixel of the first image, $I_2(x,y)$ indicates the luminance data of an (x,y) pixel of the second image, $(dx_1, dy_1)$ indicates an amount of movement of one of matched first and second images in one direction so as not to be matched to each other, and $(dx_2, dy_2)$ indicates an amount of movement of one of the matched first and second images in another direction so as not to be matched to each other, the blurring determination unit matches the first and second images to each other, calculates R(0), R(−1), and R(1) by respectively using Equations 1, 2, and 3, in a region A where the first and second images overlap each other, calculates C by using Equation 4, and determines that blurring exists in the first image if C is smaller than a preset value $$R(0) = \sum_{x,y \in A} |I_1(x, y) - I_2(x, y)|^2 \tag{1}$$

$$R(-1) = \sum_{x,y \in A} |I_1(x + dx_1, y + dy_1) - I_2(x, y)|^2 \tag{2}$$

$$R(1) = \sum_{x,y \in A} |I_1(x + dx_2, y + dy_2) - I_2(x, y)|^2 \tag{3}$$

$$C = \frac{R(-1) + R(1) - 2R(0)}{2}. \tag{4}$$

7. The digital photographing apparatus of claim 6, wherein, assuming that Area indicates an area of the region where the first and second images overlap each other and κ indicates a tuning parameter, the preset value is calculated by using Equation 5.

$$\kappa \times \text{Area} \quad (5).$$

8. The digital photographing apparatus of claim 7, wherein κ has a value 14.

9. A digital photographing apparatus comprising:
a data obtaining unit to obtain first data of a first image captured using a long time exposure and to obtain second data of a second image captured using a short time exposure;
a motion vector extraction unit to determine a motion vector between a first position of a subject in the first image and the position of the subject in the second image;
a blurring determination unit to determine whether blurring exists in the first image;
a subject location determination unit to determine whether the position of the subject in the first image is identical to the position of the subject in the second image; and
a data combination unit to create data having luminance data of the second data and having composite color data obtained by combining color data of the first and second data, as ultimate data,
wherein, assuming that $I_1(x,y)$ indicates the luminance data of an (x,y) pixel of the first image, $I_2(x,y)$ indicates the luminance data of an (x,y) pixel of the second image, Area indicates an area of the region where the first and second images overlap each other, $\sigma^2$ indicates a noise distribution of the first image, and κ indicates a tuning parameter, the blurring determination unit matches the first and second images to each other, calculates R(0) by using Equation 1 in a region A where the first and second images overlap each other, and determines that blurring exists in the first image if R(0) is larger than a value calculated by using Equation $$R(0) = \sum_{x,y \in A} |I_1(x, y) - I_2(x, y)|^2 \quad (1)$$

$$2 \times \text{Area} \times \sigma^2 \times \kappa. \quad (2)$$

10. A method of controlling a digital photographing apparatus, the method comprising:
obtaining, in the digital photographing apparatus, first data of a first image captured using a long time exposure and obtaining second data of a second image captured using a short time exposure;
determining, in the digital photographing apparatus, whether a motion vector exists between a first position of a subject in the first image and a second position of the subject in the second image;
determining whether blurring exists on the first image when it is determined that the motion vector exists;
regarding the second data as the ultimate data when it is determined that the blurring exists in the first image;
determining whether the first position of the subject in the first image is substantially identical to the second position of the subject in the second image when it is determined that the blurring does not exist in the first image;
regarding the first data as the ultimate data when the first and second positions are determined to be substantially identical; and
combining luminance data of only the second data, first color data of the first data and second color data of the second data to form the ultimate data when the first and second positions are determined not to be substantially identical.

11. The method of claim 10, wherein determining whether the motion vector exists between the first position of a subject in the first image and the second position of the subject in the second image comprises determining that the motion vector exists when the first position of the subject in the first image is substantially identical to the second position of the subject in the second image and thus the motion vector has a value 0.

12. The method of claim 10, wherein determining whether the motion vector exists between the first position of a subject in the first image and the second position of the subject in the second image comprises determining whether the motion vector exists between the first position of the subject in the first image and the second position of the subject in the second image, by using the luminance data of the second data and second luminance data of the first data.

13. The method of claim 10, wherein determining whether the first position of the subject in the first image is substantially identical to the second position of the subject in the second image comprises determining whether the motion vector between the first position of the subject in the first image and the second position of the subject in the second image is smaller than a threshold.

14. The method of claim 10, wherein determining whether the first position of the subject in the first image is substantially identical to the second position of the subject in the second image comprises determining whether a difference between the first position of the subject in the first image and the second position of the subject in the second image is equal to or smaller than two pixels both in horizontal and vertical directions.

15. A method of controlling a digital photographing apparatus, the method comprising:
(a) obtaining, in the digital photographing apparatus, first data of a first image captured using a long time exposure and obtaining second data of a second image captured using a short time exposure;
(b) determining, in the digital photographing apparatus, whether a motion vector exists between a position of a subject in the first image and the position of the subject in the second image;
(c) regarding the second data as ultimate data if it is determined that the motion vector does not exist in (b);
(d) determining whether blurring exists on the first image if it is determined that the motion vector exists in (b);
(e) regarding the second data as the ultimate data if it is determined that blurring exists in the first image in (d);
(f) determining whether the position of the subject in the first image is identical to the position of the subject in the second image if it is determined that blurring does not exist in the first image in (d);
(g) regarding the first data as the ultimate data if the positions are determined to be identical in (f); and
(h) regarding data having luminance data of the second data and having composite color data obtained by combining color data of the first and second data, as the ultimate data, if the positions are determined not to be identical in (f),
wherein, assuming that $I_1(x,y)$ indicates the luminance data of an (x,y) pixel of the first image, $I_2(x,y)$ indicates the luminance data of an (x,y) pixel of the second image, $(dx_1, dy_1)$ indicates an amount of movement of one of matched first and second images in one direction so as not to be matched to each other, and $(dx_2, dy_2)$ indicates an amount of movement of one of the matched first and second images in another direction so as not to be matched to each other, (d) comprises:

matching the first and second images to each other;

calculating R(0), R(−1), and R(1) by respectively using Equations 1, 2, and 3, in a region A where the first and second images overlap each other;

calculating C by using Equation 4; and determining that blurring exists in the first image if C is smaller than a preset value $$R(0) = \sum_{x,y \in A} |I_1(x, y) - I_2(x, y)|^2 \qquad (1)$$

$$R(-1) = \sum_{x,y \in A} |I_1(x + dx_1, y + dy_1) - I_2(x, y)|^2 \qquad (2)$$

$$R(1) = \sum_{x,y \in A} |I_1(x + dx_2, y + dy_2) - I_2(x, y)|^2 \qquad (3)$$

$$C = \frac{R(-1) + R(1) - 2R(0)}{2}. \qquad (4)$$

16. The method of claim 15, wherein, assuming that Area indicates an area of the region where the first and second images overlap each other and κ indicates a tuning parameter, the preset value is calculated by using Equation 5

$$\kappa \times \text{Area} \qquad (5).$$

17. The method of claim 16, wherein κ has a value 14.

18. A method of controlling a digital photographing apparatus, the method comprising:
(a) obtaining, in the digital photographing apparatus, first data of a first image captured using a long time exposure and obtaining second data of a second image captured using a short time exposure;
(b) determining, in the digital photographing apparatus, whether a motion vector exists between a position of a subject in the first image and the position of the subject in the second image;
(c) regarding the second data as ultimate data if it is determined that the motion vector does not exist in (b);
(d) determining whether blurring exists on the first image if it is determined that the motion vector exists in (b);
(e) regarding the second data as the ultimate data if it is determined that blurring exists in the first image in (d);
(f) determining whether the position of the subject in the first image is identical to the position of the subject in the second image if it is determined that blurring does not exist in the first image in (d);
(g) regarding the first data as the ultimate data if the positions are determined to be identical in (f); and (h) regarding data having luminance data of the second data and having composite color data obtained by combining color data of the first and second data, as the ultimate data, if the positions are determined not to be identical in (f), wherein, assuming that $I_1(x,y)$ indicates the luminance data of an (x,y) pixel of the first image, $I_2(x,y)$ indicates the luminance data of an (x,y) pixel of the second image, Area indicates an area of the region where the first and second images overlap each other, $\sigma^2$ indicates a noise distribution of the first image, and κ indicates a tuning parameter, (d) comprises:

matching the first and second images to each other;

calculating R(0) by using Equation 1 in a region A where the first and second images overlap each other; and determining that blurring exists in the first image if R(0) is larger than a value calculated by using Equation 2

$$R(0) = \sum_{x,y \in A} |I_1(x, y) - I_2(x, y)|^2 \qquad (1)$$

$$2 \times \text{Area} \times \sigma^2 \times \kappa. \qquad (2)$$

19. A tangible article of manufacture comprising a computer-readable storage medium storing machine-readable instructions that, when executed, cause a machine to at least:
obtain first data of a first image captured using a long time exposure and obtaining second data of a second image captured using a short time exposure;
determine whether a motion vector exists between a first position of a subject in the first image and a second position of the subject in the second image;
determine whether blurring exists on the first image when it is determined that the motion vector exists;
regard the second data as the ultimate data when it is determined that the blurring exists in the first image;
determine whether the first position of the subject in the first image is substantially identical to the second position of the subject in the second image when it is determined that the blurring does not exist in the first image;
regard the first data as the ultimate data when the first and second positions are determined to be substantially identical; and
combine luminance data of only the second data first color data of the first data and second color data of the second data to form the ultimate data when the first and second positions are determined not to be substantially identical.

* * * * *